US012630756B2

(12) United States Patent
Hogan et al.

(10) Patent No.: US 12,630,756 B2
(45) Date of Patent: May 19, 2026

(54) METHODS OF MAKING CROSS-LINKED PELLETIZED CHEMICALS

(71) Applicant: CARBO CERAMICS INC., Houston, TX (US)

(72) Inventors: Keith Hogan, Dublin, GA (US); Joshua Leasure, Houston, TX (US); Todd Roper, Katy, TX (US)

(73) Assignee: CARBO CERAMICS INC., Houston, TX (US)

( * ) Notice: Subject to any disclaimer, the term of this patent is extended or adjusted under 35 U.S.C. 154(b) by 360 days.

(21) Appl. No.: 16/998,858

(22) Filed: Aug. 20, 2020

(65) Prior Publication Data

US 2021/0054257 A1     Feb. 25, 2021

Related U.S. Application Data

(60) Provisional application No. 62/889,453, filed on Aug. 20, 2019.

(51) Int. Cl.
| | |
|---|---|
| *C09K 8/536* | (2006.01) |
| *C08J 3/24* | (2006.01) |
| *C08K 3/34* | (2006.01) |

(52) U.S. Cl.
CPC .............. *C09K 8/536* (2013.01); *C08J 3/247* (2013.01); *C08K 3/346* (2013.01)

(58) Field of Classification Search
CPC .. C08J 3/24; C08J 3/247; C08K 3/346; C09K 8/536
See application file for complete search history.

(56) References Cited

U.S. PATENT DOCUMENTS

| | | | |
|---|---|---|---|
| 8,614,157 B2 | 12/2013 | Pope et al. | |
| 10,287,482 B2 | 5/2019 | Ferm et al. | |
| 2009/0238988 A1* | 9/2009 | McDaniel | C09K 8/805 |
| | | | 427/221 |
| 2014/0338915 A1* | 11/2014 | Ferm | C02F 5/12 |
| | | | 210/698 |
| 2015/0119301 A1* | 4/2015 | McDaniel | E21B 43/267 |
| | | | 507/224 |

* cited by examiner

*Primary Examiner* — Alicia Bland
(74) *Attorney, Agent, or Firm* — Whitaker Chalk Swindle & Schwartz PLLC; Enrique Sanchez, Jr.

(57) ABSTRACT

A method for producing cross-linked chemical treatment agent particles includes introducing a core pellet into a fluidizer. The method also includes mixing a chemical treatment agent with a cross-linker to provide a mixture and introducing the mixture to the fluidizer. The method also includes applying the mixture to the core pellet in the fluidizer to provide a cross-linked chemical treatment agent particle having a size from about 4 mesh to about 120 mesh. The mixture may be heated prior to or during contact with the core pellet.

19 Claims, 1 Drawing Sheet

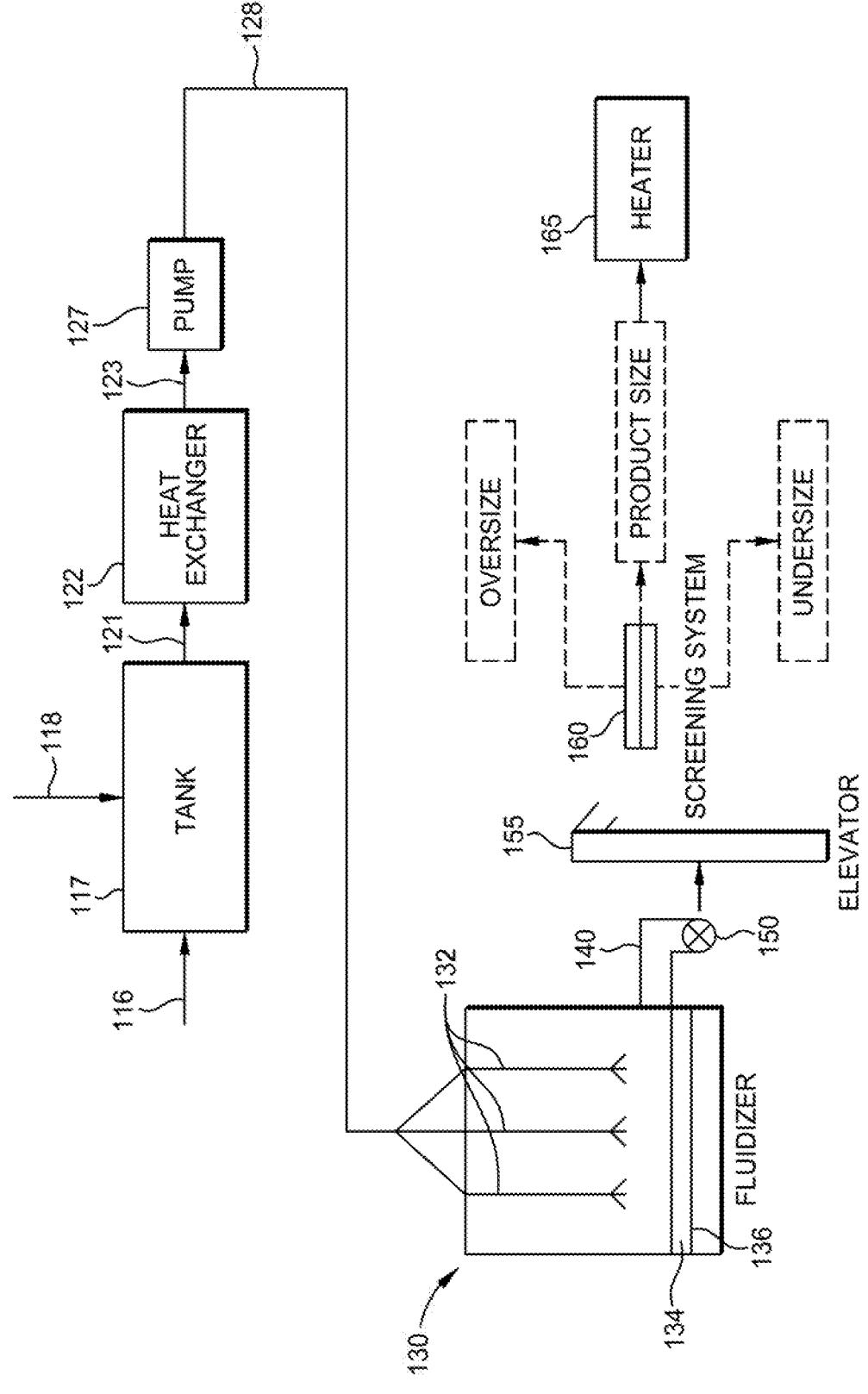

1

METHODS OF MAKING CROSS-LINKED PELLETIZED CHEMICALS

TECHNICAL FIELD

The present disclosure relates to pelletized chemicals, methods of making pelletized chemicals, and uses thereof.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the oil or gas is held in a formation having insufficient permeability for economic recovery of the oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

In the course of production, oil and gas wells oftentimes exhibit scale formation and/or paraffin deposition that can reduce well production. Many types of chemical treatment agents have been used to prevent scale formation and/or paraffin deposition. One technique for delivering such chemical treatment agents downhole includes infusing porous ceramic proppant particulates with the chemical treat agent. However, these porous ceramic proppant particulates have a limited amount of internal pore volume. As such, these particulates can only be loaded with a low level of scale inhibitor.

Another technique includes a fluid suspension that contains a mixture of a particulate, a tackifying compound and a treatment chemical. The tackifying compound causes the treatment chemical to be stuck in the oilwell formation. Yet another technique includes a scale inhibitor or a corrosion inhibitor in the form of particles that are coated, for example, with a dispersing agent. However, these techniques can result in the treatment chemical being released too rapidly subjected to downhole conditions, including increased temperatures and pressures.

Accordingly, there is still a need for controlled release scale inhibitor particles that have a high load of scale inhibitor controlled release and that could be used in a frac operation so that squeezing frequency needs could be dramatically reduced and oil producing wells could produce for much longer durations without having to be shut down for scale removal. There is also a need to manufacture such controlled release scale inhibitor particles in a manner that is cost effective.

SUMMARY

A method for producing cross-linked chemical treatment agent particles includes introducing a core pellet into a fluidizer. The method also includes mixing a chemical treatment agent with a cross-linker to provide a mixture and introducing the mixture to the fluidizer. The method also includes applying the mixture to the core pellet in the fluidizer to provide a cross-linked chemical treatment agent particle having a size from about 4 mesh to about 120 mesh. The mixture may be heated prior to or during contact with the core pellet.

BRIEF DESCRIPTION OF THE DRAWINGS

The present disclosure may best be understood by referring to the following description and accompanying drawings that are used to illustrate embodiments of the disclosure.

In the drawings:

The FIGURE illustrates a schematic view of a system for producing a cross-linked chemical treatment agent particle, according to an embodiment.

DETAILED DESCRIPTION

The present disclosure is directed to a method for producing cross-linked chemical treatment agent particles. The method includes mixing a chemical treatment agent with a cross-linker to provide a mixture and applying the mixture to one or more core pellets. In a particular embodiment, the method includes applying the mixture to a core pellet in a fluidizer to provide a cross-linked chemical treatment agent particle having a size from about 4 mesh to about 120 mesh. The mixture may be heated prior to or during contact with the core pellet. The present disclosure is also directed to a core pellet surrounded by an outer layer of a cross-linked chemical treatment agent.

In at least one embodiment, the present disclosure is directed to a method of making a cross-linked chemical treatment agent particle, such as those described in U.S. Pat. No. 10,287,482, the entire disclosure of which is hereby incorporated by reference herein. In one or more embodiments, the cross-linked chemical treatment agent particle is substantially round and spherical. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The FIGURE illustrates a schematic view of a system 100 for producing a cross-linked chemical treatment agent particle, according to an embodiment. The system 100 may include a tank 117 that receives a chemical treatment agent via line 116 and a cross-linker via line 118. In at least one embodiment, the chemical treatment agent and the cross-linker may be mixed in the tank 117 to provide a mixture that may be withdrawn from the tank 117 via line 121.

Suitable chemical treatment agents can be or include any one or more of scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, or combinations thereof. In one or more embodiments, the scale inhibitor can inhibit scales of calcium, barium, magnesium salts and the like, including barium sulfate, calcium sulfate, and calcium carbonate scales. The scale inhibitor can further have applicability in the treatment of other inorganic scales, such as zinc sulfide, iron sulfide, etc. In one or more embodiments, the scale inhibitors are anionic scale inhibitors. The scale inhibitors can include strong acids such as a phosphonic acid, phosphoric acid, phosphorous acid, phosphate esters, phosphonate/phosphonic acids, aminopoly carboxylic acids, chelating agents, and polymeric inhibitors and salts thereof. The scale inhibitors can also include organo phosphonates, organo phosphates and phosphate esters as well as the corresponding acids and salts thereof. The scale inhibitors can also include polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS). In one or more exemplary embodiments, the scale inhibitors can include DTPA, (also known as diethylenetriaminepentaacetic acid; diethyl-enetriamine-N,N,N,N,N''-pentaacetic acid; pentetic acid; N,N-Bis(2-(bis-(carboxymethyl)amino)ethyl)-glycine; diethylenetriamine pentaacetic acid, [[(Carboxymethyl) imino]bis(ethylenenitrilo)]-tetra-acetic acid); EDTA: (also known as edetic acid; ethylenedinitrilotetraacetic acid; EDTA free base; EDTA free acid; ethylenediamine-N,N,N', N'-tetraacetic acid; hampene; Versene; N,N'-1,2-ethane diyl-bis(N-(carboxymethyl)glycine); ethylenediamine tetra-acetic acid); NTA, (also known as N,Nbis(carboxymethyl) glycine; triglycollamic acid; trilone A; alpha,alpha', alpha''trimethylaminetricarboxylic acid; tri(carboxymethyl) amine; aminotriacetic acid; Hampshire NTA acid; nitrilo-2, 2 ',2''-triacetic acid; titriplex i; nitrilotriacetic acid); APCA (aminopolycarboxylic acids); phosphonic acids; EDTMP (ethylenediaminetetramethylenephosphonic acid); DTPMP (diethylene triaminepentamethylenephosphonic acid); NTMP (nitrilotrimethylenephosphonic acid); polycarbox-ylic acids, gluconates, citrates, polyacrylates, and polyaspar-tates or any combination thereof. The scale inhibitors can also include any of the ACCENT™ scale inhibitors, com-mercially available from The Dow Chemical Company. The scale inhibitors can also include potassium salts of maleic acid copolymers. In one or more embodiments, the chemical treatment agent is DTPMP.

In one or more embodiments, the chemical treatment agent can be or include any one or more salt inhibitors, such as potassium ferricyanide. In one or more embodiments, the chemical treatment agent can be or include any one or more corrosion inhibitors. Suitable corrosion inhibitors can include, but are not limited to, fatty imidazolines, alkyl pyridines, alkyl pyridine quaternaries, fatty amine quater-naries and phosphate salts of fatty imidazolines.

In one or more embodiments, the chemical treatment agent can be or include any one or more paraffin inhibitors. Suitable paraffin inhibitors can include, but are not limited to, ethylene/vinyl acetate copolymers, acrylates (such as polyacrylate esters and methacrylate esters of fatty alco-hols), and olefin/maleic esters. In one or more exemplary embodiments, the chemical treatment agent can be or include any one or more asphaltene inhibitors. Suitable asphaltene inhibitors can include, but are not limited to, asphaltene treating chemicals include but are not limited to fatty ester homopolymers and copolymers (such as fatty esters of acrylic and methacrylic acid polymers and copo-lymers) and sorbitan monooleate.

In one or more embodiments, the chemical treatment agent is a scale inhibitor that is cross-linked by ester bonds, amide bonds, imide bonds, phosphoester bonds, or combi-nations thereof. Examples of the scale inhibitor include, but are not limited to, polymers, oligomers, and small molecules of carboxylates, aminocarboxylates, acrylates, sulfates, sulfonates, phosphonates, phosphinos, and copolymers or mixed compounds thereof. The scale inhibitor may contain polymers, oligomers, or copolymers of at least one ethyl-enically unsaturated monomer which may be classified as anionic, non-ionic, and cationic. In one embodiment, the polymer contains at least one ethylenically unsaturated monomer which is anionic and is called an anionic ethyl-enically unsaturated monomer. In one embodiment, the ethylenically unsaturated anionic monomer comprises acrylic acid, methacrylic acid, maleic acid, itaconic acid, 2-acrylamido-2-methyl propane sulfonic acid, or mixtures thereof.

It should be understood that the above-mentioned car-boxylates, acrylates, sulfates, sulfonates, phosphonates, phosphinos, and aminocarboxylates can include the alkali metal salts thereof. Preferably, the scale inhibitor according to the present disclosure should include a substantial number of carboxylate groups for cross-linking. The copolymers can be created in either the metal ion salt form or the acid form.

As used herein, the term "anionic ethylenically unsatu-rated monomer" means an ethylenically unsaturated mono-mer which is capable of introducing a negative charge to the polymer that is the scale inhibitor. These anionic ethyleni-cally unsaturated monomers can include, but are not limited to, acrylic acid, methacrylic acid, ethacrylic acid, α-chloro-acrylic acid, α-cyano acrylic acid, β-methyl-acrylic acid (crotonic acid), α-phenyl acrylic acid, βacryloxy propionic acid, sorbic acid, α-chloro sorbic acid, angelic acid, cin-namic acid, p-chloro cinnamic acid, β-styryl acrylic acid (1-carboxy-4-phenyl butadiene-1,3), itaconic acid, maleic acid, citraconic acid, mesaconic acid, glutaconic acid, aco-nitic acid, fumaric acid, tricarboxy ethylene, muconic acid, 2-acryloxypropionic acid, 2-acrylamido-2-methyl propane sulfonic acid, vinyl sulfonic acid, sodium methallyl sulfonate, sulfonated styrene, allyloxybenzene sulfonic acid, vinyl phosphonic acid, maleic acid, and combinations thereof. Moieties such as maleic anhydride or acrylamide that can be derivatized (hydrolyzed) to moieties with a negative charge are also suitable. The preferred anionic ethylenically unsaturated monomers are acrylic acid, meth-acrylic acid, maleic acid, itaconic acid and 2-acrylamido-2-methyl propane sulfonic acid.

The non-ionic and cationic ethylenically unsaturated monomers are optional. As used herein, the term "nonionic ethylenically unsaturated monomer" means an ethylenically unsaturated monomer which does not introduce a charge in to the polymer that is the scale inhibitor. These nonionic ethylenically unsaturated monomers include, but are not limited to, acrylamide; methacrylamide; N-alkyl(meth)acry-lamide; N,N-dialkyl(meth)acrylamide such as N,N-dim-ethylacrylamide; hydroxyalkyl(meth)acrylates; alkyl(meth) acrylates such as methylacrylate and methylmethacrylate; vinyl acetate; vinyl morpholine; vinyl pyrrolidone; vinyl caprolactum; ethoxylated alkyl; alkaryl or aryl monomers such as methoxypolyethylene glycol (meth)acrylate; allyl glycidyl ether; allyl alcohol; glycerol (meth)acrylate; mono-mers containing silane, silanol and siloxane functionalities; and combinations thereof. The nonionic ethylenically unsaturated monomer is preferably water soluble. Preferred nonionic ethylenically unsaturated monomers include acry-lamide, methacrylamide, N-methyl(meth)acrylamide, N,N dimethyl(Meth)acrylamide, vinyl pyrrolidone, and vinyl caprolactam.

An example of a polyacrylate is a low molecular weight polyacrylic acid. Another example is a low molecular weight polymaleic acid. An example of an effective copolymer for scale control is the copolymer of acrylic acid and maleic acid with a mole ratio of 2:1. Other effective scale inhibitors are polymers that contain sulfonate groups. These polymers that are good scale inhibitors are well known in the art. Different aqueous environments, in particular where different ionic species are present, call for the addition of additional monomers which can mitigate the polymer precipitation due to presence of the electrolytes in solution. Calcium and iron are two ions which are often considered when selecting the polymers. For example, a copolymer of acrylic acid, maleic acid, methylmethacrylate, and 2-acrylamido-2-methyl propane sulfonic acid is useful in conditions where ion tolerance is required. An example of a polyphosphonate is diethylenetriamine penta(methylene phosphonic acid) (DTPMP); an example of a polyaminocarboxylate is glutamic acid diacetic acid (GLDA); and an example of a small molecule of polycarboxylate is citric acid. In one embodiment, Polymer A (further described in the Examples) is used as the scale inhibitor. In another embodiment, Alcosperse 602A, Polymer B, or Polymer C (both Polymers B and C are further described in the Examples) is used.

The cross-linker may be a polyol, a polyamine, an amino alcohol, a polyepoxide, or mixtures thereof. For purposes of this disclosure, a polyol may be described as a molecule having 2 or more hydroxyl groups. Examples of a polyol include, but are not limited to, glycerol, 1,6-hexanediol, pentaerythritol, and high molecular weight polyols (e.g., polyvinylalcohol). For purposes of this disclosure, a polyamine may be described as a molecule having 2 or more amine groups. Examples of a polyamine include, but are not limited to, diethylenetriamine (DETA), tris(2-aminoethyl) amine (Tris), 1,6-hexanediamine, and high molecular weight polyamines (e.g., polyvinylamine, polyethyleneamine, etc.). In one embodiment, at least two of the amine functionalities in the polyamine are primary or secondary. Examples of an amino alcohol include, but are not limited to, ethanolamine, diethanolamine, N(2-hydroxylethyl)ethylenediamine, and N,N-bis(2-hydroxyethyl)ethylenediamine. In one embodiment, at least one of the amine functionality in the amino alcohol is not tertiary. The polyepoxide include, but are not limited to, bisepoxides and polyepoxide functional compounds, such as butanediol diglycidyl ether. It should be understood that throughout the present specification, unless otherwise stated, the prefix "poly" encompasses the prefixes "di", "tri", "oligo", etc. For example, polyamine includes diamine, triamine, oligoamine, as well as polyamine.

In one aspect of the present disclosure, the cross-linker used in the present disclosure may act as a corrosion inhibitor upon release. Therefore, when this type of cross-linker is used in the particle, the particle provides scale inhibiting properties and corrosion inhibiting properties simultaneously. Examples of a cross-linker that may act as a corrosion inhibitor are alkyl polyamines. Any corrosion inhibitor that contains multiple free amine or multiple free alcohol functionalities are useful for this disclosure. In one embodiment, the alkyl polyamines are alkyldiamines and/or alkyltriamines. The alkyl polyamines include, but are not limited to, tallow propylenediamine, coco propylenediamine, tallow dipropylene triamine, and coco dipropylene triamine. Further examples of a cross-linker that may act as a corrosion inhibitor include, but are not limited to, N-tallow-1,3-diaminopropane (available from Akzo Nobel Surface Chemistry LLC as Duomeen C), N-tallow-1,3-tallow-diamine (available from Akzo Nobel Surface Chemistry LLC as Duomeen T), tallow dipropylene triamine (available from Akzo Nobel Surface Chemistry LLC as Triamine YT), ethoxylated (3) N-coco-1,3-diamine propane (available from Akzo Nobel Surface Chemistry LLC as Ethoduomeen C/13), ethoxylated (12) Ntallow-1,3-diamine propane (available from Akzo Nobel Surface Chemistry LLC as Ethoduomeen T/22), and ethoxylated (2) cocoalkylamines (available from Akzo Nobel Surface Chemistry LLC as Ethomeen C/12).

In another aspect of the present disclosure, the cross-linker used in the present disclosure may have biocidal activity upon release. Therefore, when this type of cross-linker is used in the particle, the particle provides scale inhibiting properties and biocidal properties simultaneously. Any biocide that contains multiple free amine or multiple alcohol functionalities are useful for this disclosure. Examples of a cross-linker that may have biocidal activity include, but are not limited to, N-(3-aminopropyl)-N-dodecylalkyl trimethylene diamines, distilled (available from Akzo Nobel Surface Chemistry LLC as Triamine Y12D), N-coco-1,3diaminopropane or cocodiamine (available from Akzo Nobel Surface Chemistry LLC as Duomeen C), and tallow dipropylene triamine (available from Akzo Nobel Surface Chemistry LLC as Triamine YT). Ethoxylated quaternary amines (available from Akzo Nobel Surface Chemistry LLC under the trade name Ethoquad) are also useful for this disclosure for their corrosion inhibition and biocide activity.

The mixture may be an aqueous mixture containing the chemical treatment agent in any suitable amounts. The chemical treatment agent may be present in the mixture in an amount of about 25 wt %, about 30 wt %, about 35 wt %, or about 40 wt % to about 45 wt %, about 50 wt %, or about 55 wt % or more. The mixture may contain a cross-linker in any suitable amounts. The cross-linker may be present in the mixture in an amount of about 1 wt %, about 2 wt %, about 4 wt %, or about 8 wt % to about 12 wt %, about 16 wt %, or about 20 wt %. The mixture man have any suitable weight ratio of chemical treatment agent to cross-linker. The mixture may have a chemical treatment agent to cross-linker weight ratio of about 25:1, about 20:1, about 15:1, or about 10:1 to about 8:1, about 6:1, about 4:1, about 3:1, or about 2:1. The mixture may have any suitable pH. The mixture may have a pH from about 2 to about 6, from about 2.5 to about 5.5, from about 3.5 to about 5, or from about 2 to about 4.

The system may also include a heat exchanger 120 that heats the mixture via line 121 to a temperature from about 20° C., about 50° C., about 75° C., about 100° C., or about 150° C. to about 175° C., about 200° C., about 225° C., or about 250° C. to provide a heated mixture. The heated mixture may be withdrawn from the heat exchanger 122 via line 123 and introduced to a pump 127 that transfers the heated mixture, under pressure, from the heat exchanger 122 to a fluidizer 130 via a conduit (shown as line 128).

The fluidizer 130 may include one or more atomizing nozzles 132, a particle bed 134, and a plate 136. The particle bed 134 may be supported by the plate 136, which can include a perforated, straight or directional plate. Hot air may flow through the plate 136. The particle bed 134 may include core pellets or seeds, from which cross-linked chemical treatment agent particles of a target size may be grown. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for cross-linked chemical treatment agent particles made according to the present methods. In certain embodiments, the seed contains about 5% to about 20% of the total volume of a cross-linked chemical treatment agent particle formed therefrom. The heated mixture may be sprayed, under pressure, through the atomizing nozzles 132, and the slurry spray coats the seeds to form the cross-linked chemical treatment agent particles.

External seeds may be placed on the perforated plate 136 before atomization of the slurry before the fluidizer 130 begins operating. If external seeds are used, the seeds can be taken from the fluidizer 130, or by another, separate fluidizer, at a target seed size. In one or more embodiments, the external seeds may be or include particles from an undersized product fraction exiting the screening system 160. In one or more embodiments, the external seeds may be formed from clay based materials, such as from kaolin and/or bauxite. For example, the external seeds may also be prepared in a high intensity mixing process such as that described in U.S. Pat. No. 4,879,181, the disclosure of which is incorporated herein by reference.

Alternatively, seeds for the particle bed are formed by the atomization of the mixture, thereby providing a method by which the mixture "self-germinates" with its own seed. According to one such embodiment, the heated mixture is fed through the fluidizer 130 in the absence of a seeded particle bed 134. The heated mixture droplets exiting the nozzles 132 solidify, but are small enough initially that they get carried out of the fluidizer 130 by air flow and caught as "dust" (fine particles) by a dust collector, which may, for instance, be an electrostatic precipitator, a cyclone, a bag filter, a wet scrubber or a combination thereof. The dust from the dust collector is then fed to the particle bed 134 through a dust inlet, where it is sprayed with the heated mixture exiting the nozzles 132. The dust may be recycled a sufficient number of times, until the seed particle has grown to a point where it is too large to be carried out by the air flow and can serve as seed. The dust can also be recycled to another operation in the process, for example, the tank 117. Once the seed particle has grown to a sufficient size, they may accumulate in the particle bed 134 as solidified pellets. The accumulated solidified pellets may then flow out of the fluidizer 130 via an outlet 140.

The system 100 may also include a rotary valve 150 that transfers the solidified pellets to an elevator 155, which feeds the solidified pellets to a screening system 160 that separates the solidified pellets into one or more fractions (e.g., an oversized fraction, a product fraction, and an undersized fraction). In a continuous process, the oversize solidified pellets may be broken down and recycled to be blended with or alternatively fed into the mixture. Alternatively, oversize solidified pellets can be broken down and recycled to the particle bed 134 in the fluidizer 130. The undersize fraction exiting the screening system 160 includes those solidified pellets that are smaller than the desired product size. In a continuous process, these solidified pellets may be recycled to the fluidizer 130, where they can be fed through as seeds or as a secondary feed to the fluidizer 130. The product fraction includes the solidified pellets having the desired size. The product fraction of the solidified pellets may be transferred to a drier 165, where the green pellets are dried and/or heated to provide dried, solidified pellets. Additional details describing one or more portions of the system 100 are disclosed U.S. Pat. No. 8,614,157, the disclosure of which is incorporated herein by reference.

The heated mixture can be subjected to any suitable temperature in the fluidizer 130. In one or more embodiments, the mixture in the fluidizer 130 can be subjected to, and/or cooled or heated to, an internal temperature in the fluidizer 130 of from about 75° C., about 85° C., or about 95° C. to about 120° C., about 130° C., or about 150° C. or more as the mixture is deposited onto the seed particles to provide the solidified pellets. In one or more embodiments (not shown), the mixture via line 121 may bypass the heat exchanger 122 and be introduced, directly or indirectly, to the fluidizer 130, whereby the mixture may be heated to a temperature of from about 75° C., about 85° C., or about 95° C. to about 120° C., about 130° C., or about 150° C. or more by being subjected to the an internal temperature in the fluidizer 130 as the mixture is deposited onto the seed particles to provide the solidified pellets.

The product fraction of the solidified pellets, or dried, solidified pellets, may be withdrawn from the system 100 as the cross-linked chemical treatment agent particle described herein. The cross-linked chemical treatment agent particles may contain the chemical treatment agent in any suitable amounts. In an embodiment, the amount of the chemical treatment agent in the particle is from about 30 wt % to about 95 wt %; in one embodiment the amount of the chemical treatment agent is from about 50 wt % to about 95 wt %; in another embodiment from about 65 wt % to about 95 wt %; and in yet another embodiment from about 80 wt % to about 95 wt %. The amount of the chemical treatment agent is calculated as the weight percentage of chemical treatment agent relative to the total solids in the composition.

In one or more embodiments (not shown), the cross-linked chemical treatment agent particles may be obtained by spraying the mixture onto the core pellets. For example, a plurality of core pellets contained in a drum or other vessel, such as a mixing vessel, may be sprayed with the mixture or heated mixture via one or more nozzles. In one or more embodiments, the core pellets may be heated prior to contact with the mixture in order to supply heat necessary to obtain the heated mixture.

The cross-linked chemical treatment agent particles can have any suitable size. For example, the cross-linked chemical treatment agent particles can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several embodiments, the cross-linked chemical treatment agent particle has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several embodiments, the cross-linked chemical treatment agent particle has a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

The cross-linked chemical treatment agent particles according to the present disclosure may be relatively soft and compressible. The compressibility of particles may be measured using a texture analyzer equipped with a 25 kg load cell and 7 mm diameter flat-tipped stainless steel rod or alternatively by using parallel plates between which particles can be compressed under load pressures. The particles can be measured in multiple configurations, including compressing the particles in a bed or matrix of identical particles; by compressing the particles mixed in a matrix of other particles (such as sand particles appropriate for frac operations); and, by placing individual particles between optical plates which can be compressed and through which the particles can be observed by optical microscopy. When examined either as a single particle or, as a 10-mm thick lightly packed bed of particles, in one embodiment the particles have a compressibility of about 30% at pressures about 10 MPa; and, of about 30% to 75% at pressures of about 100 to 1000 MPa, wherein under these pressures the final shape will be determined by the uniformity and geometry of the pressure applied and the generation of fine particles (fines) is observed to be minimal. In another embodiment, the particles have a compressibility of about 75% at pressures about 10 MPa; and, of about 75 to 90% at pressures of about 100 to 1000 MPa, wherein under these pressures the final shape will be determined by the uniformity and geometry of the pressure applied and the generation of fines is observed to be minimal. In yet another embodiment, the particles have a compressibility in size of about 10% to about 75% when compressed under pressure of up to about 10 MPa; in a further embodiment, of about 30% to about 75% when compressed under pressure of up to about 10 MPa. In another embodiment, the particles have a compressibility in size of about 10% to about 90% when compressed under pressure of up to about 1000 MPa; in a further embodiment, of about 30% to about 90% when compressed under pressure of up to about 1000 MPa.

The cross-linked chemical treatment agent particles according to the present disclosure may at least partially dissolve or breakdown under subterranean conditions and/or upon contract with one or more produced fluids, including produced water, produced hydrocarbons, and combinations thereof to release the chemical treatment agent and/or cross-linker into the surrounding subterranean environment or wellbore environment from the chemical treatment agent particles.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. Unless stated otherwise, the terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method for producing cross-linked chemical treatment agent particles, comprising:

introducing a core pellet to a fluidizer including one or more atomizing nozzles;

mixing a chemical treatment agent with a cross-linker to provide a mixture;

heating the mixture to a first temperature between about 150° C. to 250° C.; and applying the heated mixture to the core pellet in the fluidizer at a second temperature between about 120° C. to about 130° C. to provide a cross-linked chemical treatment agent particle, wherein applying the mixture to the core pellet in the fluidizer includes spraying the mixture through the one or more atomizing nozzles of the fluidizer, wherein:

the cross-linked chemical treatment agent particle comprises a cross-linked chemical treatment agent layer surrounding the core pellet, the core pellet comprises kaolin, bauxite, or a combination thereof, the cross-linked chemical treatment agent layer comprises the chemical treatment agent cross-linked with the cross-linker by bonds selected from the group consisting of ester bonds, amide bonds, imide bonds, phosphoester bonds, and combinations thereof, the cross-linker is selected from the group consisting of a polyol, a polyamine, an amino alcohol, and combinations thereof, the chemical treatment agent comprises a scale inhibitor, the cross-linked chemical treatment agent layer comprises about 65 wt % to about 95 wt % of the cross-linked chemical treatment agent particle, the cross-linked chemical treatment agent particle has a size of about 4 mesh to about 120 mesh, and the cross-linked chemical treatment agent particle comprises a compressibility of about 10% to about 90% at pressures of up to about 1000 MPa.

2. The method of claim 1, wherein the chemical treatment agent is a scale inhibitor comprising a polymer having at least one anionic ethylenically unsaturated monomer.

3. The method of claim 1, wherein the mixture comprises a chemical treatment agent to cross-linker weight ratio of about 25:1 to about 2:1.

4. The method of claim 1, wherein at least a portion of the chemical treatment agent particle dissolves under subterranean conditions to release the chemical treatment agent and the cross-linker into the subterranean environment.

5. The method of claim 1, wherein the first temperature is between about 165° C. to 250° C.

6. The method of claim 1, wherein the core pellet comprises about 5% to about 20% of the total volume of a cross-linked chemical treatment agent particle.

7. The method of claim 1, wherein the amount of chemical treatment agent in the cross-linked chemical treatment agent layer comprises about 80 wt % to about 95 wt % of the chemical treatment agent particle.

8. The method of claim 1, wherein the chemical treatment agent particle comprises a size of about 10 mesh to about 60 mesh.

9. The method of claim 8, wherein the chemical treatment agent particle has a size of about 20 mesh to about 40 mesh.

10. The method of claim 1, wherein the chemical treatment agent particle has a size of about 16 mesh to about 20 mesh.

11. The method of claim 3, wherein the mixture comprises a chemical treatment agent to cross-linker weight ratio of about 20:1 to about 3:1.

12. The method of claim 11, wherein the mixture comprises a chemical treatment agent to cross-linker weight ratio of about 10:1 to about 8:1.

13. The method of claim 5, wherein the first temperature is between about 200° C. to about 225° C.

14. The method of claim 1, wherein the mixture has a pH of about 2 to about 6.

15. The method of claim 14, wherein the mixture has a pH of about 3.5 to about 5.

16. The method of claim 1, wherein the second temperature is about 130° C.

17. The method of claim 1, wherein the second temperature is about 120° C.

18. The method of claim 1, wherein the cross-linker comprises tallow propylenediamine.

19. The method of claim 18, wherein the scale inhibitor comprises a plurality of carboxylate groups and the bonds comprise amide bonds.

* * * * *